Feb. 2, 1965    A. J. MALETZKE    3,168,349
WHEEL COVER
Filed March 25, 1963

INVENTOR.
Arnold J. Maletzke
BY
Herbert Furman
ATTORNEY

3,168,349
WHEEL COVER
Arnold J. Maletzke, Rochester, Mich., assignor to General Motors Corporation, Detroit, Mich., a corporation of Delaware
Filed Mar. 25, 1963, Ser. No. 267,632
9 Claims. (Cl. 301—37)

This invention relates to wheel covers and more particularly to a vehicle wheel cover of the self-retaining type.

One feature of this invention is that it provides a wheel cover having improved means for self-retainingly mounting the cover on a vehicle wheel. Another feature of this invention is that it provides a wheel cover having angularly displaceable retaining finger means mounted on a flange structure to a predetermined limit position, with the retaining finger means and the flange structure limiting displacement of the finger means to first and second predetermined limit positions with respect to the flange structure. A further feature of this invention is that it provides a wheel cover having cantilevered retaining finger means mounted on a flange structure thereof and means limiting displacement of the finger means relative to the flange srtucture to a predetermined limit position, with the flange structure being distorted by the finger means when the finger means moves beyond the predetermined limit position.

These and other features and advantages of the wheel cover of this invention will be readily apparent from the following specification and drawings wherein.

Figure 1:
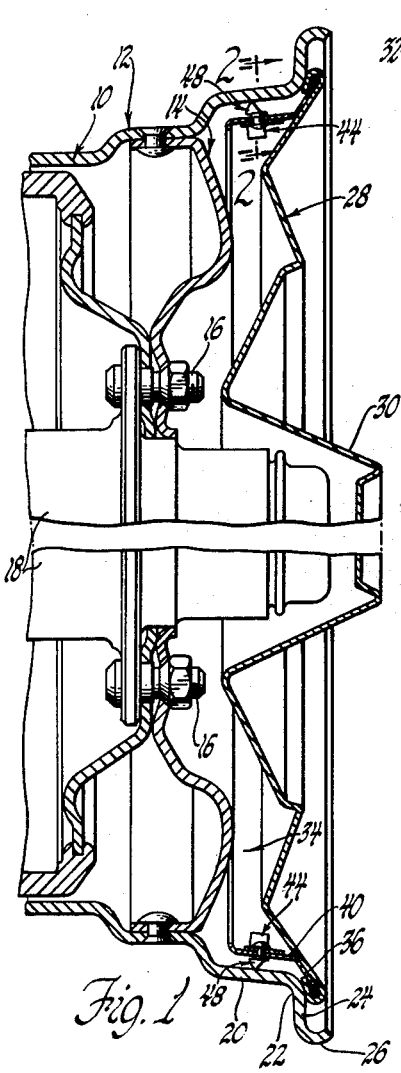
FIGURE 1 is a sectional view of a vehicle wheel having a cover according to this invention mounted thereon.

Referring now particularly to FIGURE 1 of the drawings, a conventional vehicle wheel designated generally as 10 includes a wheel rim 12 and a wheel body or spider 14 suitably secured thereto. Wheel 10 is bolted at a number of places at 16 to the axle 18 of the vehicle to mount the wheel thereon. The rim 12 includes an intermediate generally axially and radially outwardly extending annular flange 20 which merges on an arcuate juncture shoulder 22 into a generally radially outwardly extending axially facing terminal flange 24 which terminates in a lip flange 26.

Figure 4:
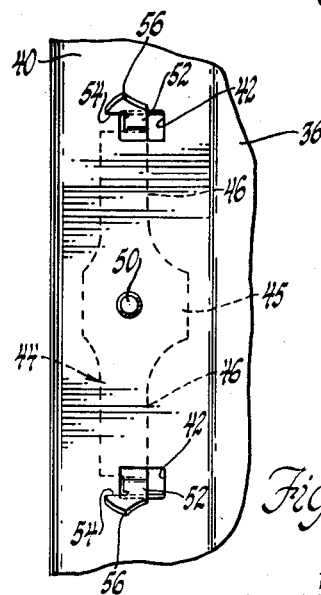
FIGURE 4 is a view taken generally along the plane indicated by line 4—4 of FIGURE 3.
Figure 5:
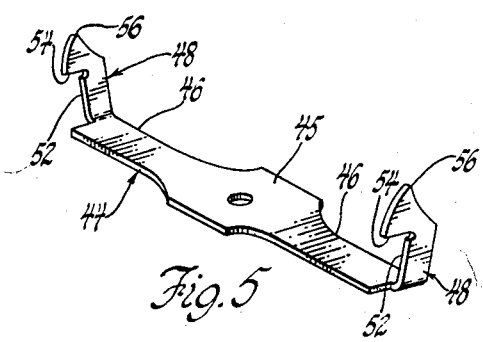
FIGURE 5 is a perspective view of the spring clip retaining member.

A wheel cover 28 includes an outer cover body or face 30 which covers the major portion of the wheel 10 and includes a return bent peripheral marginal flange 32 which is adapted to engage the flange 24 of the wheel rim when the cover is mounted on the wheel to limit axial inward movement of the cover relative to the wheel. The retaining flange structure 34 of the cover includes a generally radially and axially outwardly extending annular flange portion 36 which nests against the rear face of the cover body 30, adjacent the margin thereof, and terminates in a return bent flange 38 which nests within and against the flange 32 of the cover body to secure the structure 34 thereto. Flange structure 34 further includes a generally axailly inwardly extending annular flange portion 40 which is located in radially spaced opposed relationship to the intermediate flange 20 of the wheel rim 12 when the cover 28 is mounted thereon. As best shown in FIGURE 4, the flange portion 40 is provided with spaced pairs of axially elongated openings 42. In the embodiment shown, there are four such spaced pairs of openings, although it will be understood that more or less pairs of openings may be provided if desired.

Cover 28 is mounted on the wheel 10 by a plurality of spring clip type retaining members 44, each of which includes a central elongated body portion 45 and a pair of oppositely extending legs 46 terminating in laterally extending retaining finger means 48, each of which is adapted to engage the wheel 10 to retain the cover on the wheel. The members 44 normally nest or bear against the inner surface of the flange structure 34 and are riveted thereto at 50 to locate the legs 46 of the members 44 in cantilever relation to the flange structure 34. The retaining fingers 48 of members 44 project through the spaced pairs of openings 42, generally radially outwardly with respect to the flange structure 34, and include reduced leg portions 52 having the axially inner edges thereof located in adjacent spaced relationship to the axially inner edges of the openings 42 to locate the shoulders 54 of the retaining fingers in overlying relationship to the flange structure 34 axially inwardly of and adjacent the axially inner edges of the openings 42.

Figure 2:
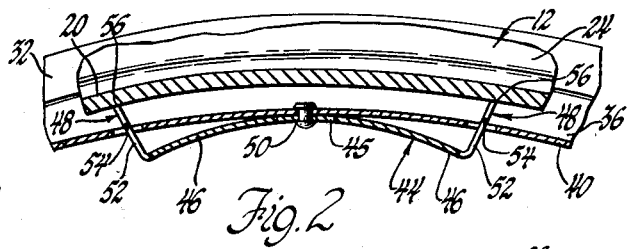
FIGURE 2 is an enlarged sectional view taken generally along the plane indicated by line 2—2 of FIGURE 1.
Figure 3:
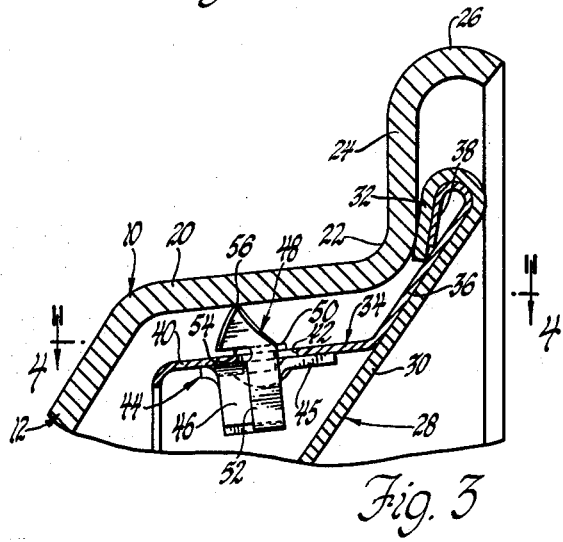
FIGURE 3 is an enlarged view of a portion of FIGURE 1.

When the cover is mounted on the wheel, the flange portion 40 is first aligned with the opening defined by the intermediate flange 20 and the cover is then pushed axially inwardly of the wheel until the flange 32 of the cover body engages the terminal flange 34 of the wheel rim. Normally the retaining tips or edges 56 of the fingers 48 project to a larger radius than the largest radius of the flange 20 so that the fingers 48 are forced inwardly of the flange structure 34 when the cover is mounted on the wheel and in turn deflect the spaced legs 46 of the members 44 to their position relative to the body portions 45 as shown in FIGURE 2. The movement of the retaining fingers 48 inwardly of the flange structure 34 moves the shoulders 54 thereof into closely spaced adjacent relationship to the flange structure 34, as shown in FIGURES 2 and 3.

As is well-known, the rim 12 is continuously distorted out of its normal circulr shape into a generally oval shape during operation of the vehicle so that the intermediate flange 20 will continuously approach and depart from the flange structure 34 at circumferentially succeeding locations as the wheel rotates. This causes the fingers 48 to move inwardly and outwardly of the openings 42, but as soon as the fingers 48 have moved inwardly a predetermined distance, the shoulders 54 of the fingers engage the flange structure 34 and thereafter the members 44 and the flange structure 34 move radially inwardly of the wheel as a unit as the flange structure is distorted. By permitting only a limited radial inward deflection of the legs 46 of the members 44, the fatigue life of the members 44 is greatly increased and thus the cover will be retained on the wheel without failure during service. In past wheel covers of the spring clip type, the covers have often been lost after a short period of service since the continual flexing of the legs 46 of the spring clip members has caused these legs to exceed their normal fatigue life and lose their retaining ability so that the cover tends to be thrown off the wheel under stopping and starting conditions.

Thus, this invention provides an improved wheel cover of the self-retaining type.

I claim:

1. A wheel cover comprising, a cover member including an apertured flange portion, retaining means mounted on said flange portion and having a portion thereof displaceable with respect to said flange portion and including means projecting through said aperture and engageable with a poriton of a vehicle wheel to displace said retaining means portion relative to said cover member flange portion, and means on said retaining means portion engageable with said cover member flange portion adjacent said aperture therein after said retaining means portion 2. A wheel cover comprising, a cover member including an apertured flange portion, retaining means mounted on said flange portion and having a portion thereof displaceable with respect to said flange portion and including means projecting through said aperture and engageable with a portion of a vehicle wheel to displace said retaining means portion relative to said cover member flange portion, and means on said retaining means portion overlying said cover member flange portion adjacent said aperture therein and engageable therewith after said retaining means portion has been displaced a predetermined amount relative to said cover member flange portion.

3. A wheel cover comprising, a cover member including an annular axially extending apertured flange portion, a retaining member mounted on said flange portion and including an arm portion displaceable with respect to said flange portion and having a generally radially extending means projecting through said aperture and engageable with a portion of a vehicle wheel to displace said means relative to said aperture and displace said arm portion relative to said flange portion, and means on said retaining member engageable with said flange portion adjacent said aperture after said arm portion has been displaced a predetermined amount relative to said flange portion.

4. A wheel cover comprising, a cover member including an annular axially extending apertured flange portion, a retaining member mounted on said flange portion and including an arm portion displaceable with respect to said flange and having a generally radially extending tooth portion projecting through said aperture and engageable with a portion of a vehicle wheel to displace said tooth portion relative to said aperture and displace said arm portion relative to said body portion, and means on said tooth portion engageable with said flange portion adjacent said aperture after said arm portion has been displaced a predetermined amount relative to said flange portion.

5. A wheel cover comprising, a cover member including an annular axially extending apertured flange portion adapted to have one side thereof juxtaposed to a portion of a vehicle wheel, a retaining member mounted on the opposite side of said flange portion and including an arm portion extending divergently to said opposite side and having retaining means extending through said aperture to said one side of said flange portion and engageable with the portion of the vehicle wheel to displace said arm portion relative to said opposite side of said flange portion, and means on said retaining member engageable with said one side of said flange portion after said arm portion has been displaced a predetermined amount relative to said other side of said flange portion.

6. A wheel cover comprising, a cover member including an annular axially extending apertured flange portion adapted to have one side thereof juxtaposed to a portion of a vehicle wheel, a retaining member mounted on the opposite side of said flange portion and including an arm extending divergently to said opposite side and terminating in a generally radially extending portion projecting through said aperture to said one side of said flange portion and engageable with the portion of the vehicle wheel to displace said arm relative to said opposite side of said flange portion, and means on said radially extending arm portion engageable with said one side of said flange portion adjacent said aperture therein after said arm has been displaced a predetermined amount relative to said other side of said flange portion.

7. A wheel cover as recited in claim 6 wherein said means on said radially extending arm portion overlies the other side of said flange portion.

8. A wheel cover as recited in claim 6 wherein said radially extending portion includes a tooth engageable with the portion of the vehicle wheel and having a portion thereof engageable with the other side of said flange portion.

9. A wheel cover comprising, a cover member including an axially extending annular flange portion, a retaining member having a body portion mounted on said flange portion and including a pair of cantilever arm portions extending circumferentially and oppositely with respect to each other, each of said arm portions terminating in a generally radially extending tooth portion engageable with a portion of a vehicle wheel to angularly displace the respective arm portions relative to said flange portion, and means on said tooth portions engageable with said flange portion after said arm portions have been displaced through a predetermined angle to limit further displacement of said arm portions relative to said flange portion.

References Cited in the file of this patent
UNITED STATES PATENTS

| | | |
|---|---|---|
| 1,664,500 | Bates | Apr. 3, 1928 |
| 2,698,203 | Landell | Dec. 28, 1954 |
| 3,037,816 | Mulhern | June 5, 1962 |

UNITED STATES PATENT OFFICE

CERTIFICATE OF CORRECTION

Patent No. 3,168,349                             February 2, 1965

Arnold J. Maletzke

It is hereby certified that error appears in the above numbered patent requiring correction and that the said Letters Patent should read as corrected below.

Column 1, line 16, for "to a predetermined limit position, with" read -- thereof and cooperating means on --; line 24, for "srtucture" read -- structure --; column 2, line 39, for "circulr" read -- circular --.

Signed and sealed this 29th day of June 1965.

(SEAL)
Attest:

ERNEST W. SWIDER
Attesting Officer

EDWARD J. BRENNER
Commissioner of Patents